United States Patent [19]
Park et al.

[11] Patent Number: 5,608,534
[45] Date of Patent: Mar. 4, 1997

[54] APPARATUS AND METHOD FOR PERFORMING RESERVATION-RECORDING OF VIDEO CASSETTE RECORDER

[75] Inventors: Ho T. Park, Kyungki-do; Keun Y. Jae, Kyunjgki-do; Bok H. Baek; Kyung K. Ryu, both of Kyungki-do, all of Rep. of Korea

[73] Assignee: Goldstar Co., Ltd., Seoul, Rep. of Korea

[21] Appl. No.: 233,613

[22] Filed: Apr. 20, 1994

[30] Foreign Application Priority Data

Jun. 24, 1993 [KR] Rep. of Korea ............... 11613/1993
Sep. 17, 1993 [KR] Rep. of Korea ............... 18842/1993
Feb. 8, 1994 [KR] Rep. of Korea ............... 2435/1994

[51] Int. Cl.$^6$ ............................................. H04N 5/76
[52] U.S. Cl. ............................................. 386/83
[58] Field of Search ................... 358/335; 360/33.1; 348/731; 455/179.1, 181.1, 184.1, 185.1, 186.1; H04N 5/76

[56] References Cited

U.S. PATENT DOCUMENTS

| | | | |
|---|---|---|---|
| 4,519,003 | 5/1985 | Scholz | 358/335 |
| 4,631,601 | 12/1986 | Brugliera et al. | 358/335 |
| 4,823,387 | 4/1989 | Tults | 380/13 |
| 5,166,911 | 11/1992 | Misawa et al. | 368/10 |
| 5,335,079 | 8/1994 | Yuen et al. | 358/335 |
| 5,361,173 | 11/1994 | Ishii et al. | 360/72 |
| 5,390,027 | 2/1995 | Henmi et al. | 358/335 |
| 5,430,552 | 7/1995 | O'Callaghan | 358/335 |
| 5,448,369 | 9/1995 | Lee et al. | 358/335 |
| 5,479,268 | 12/1995 | Young et al. | 358/335 |
| 5,499,102 | 3/1996 | Hashimoto | 358/335 |

FOREIGN PATENT DOCUMENTS 5-290441  5/1993  Japan ................ H04N 5/782

Primary Examiner—Tommy P. Chin
Assistant Examiner—Vu Le
Attorney, Agent, or Firm—Fish & Richardson P.C.

[57] ABSTRACT

An apparatus and a method for performing reservation-recording of a video cassette recorder. The apparatus comprises a G code input unit for inputting a G code, a first memory for storing channel positions and tuning data, a second memory for storing broadcasting station codes and names, a decoder for decoding the G code from the G code input unit, a controller for controlling the reservation-recording of the video cassette recorder in response to outputs from the first and second memory and the decoder, a tuner for tuning a broadcasting signal under the control of the controller, a pilot signal detector for detecting a pilot signal from the tuned broadcasting signal and outputting the detected pilot signal to the controller, a recording section for recording the tuned broadcasting signal under the control of the controller, a third memory for storing the broadcasting station names and guide channel numbers corresponding thereto, the third memory storing desired ones of the channel positions from the first memory under the control of the controller, a fourth memory for storing the output from the decoder and a desired one of the channel positions from the third memory under the control of the controller, and an on-screen display unit for performing an on-screen display function under the control of the controller.

13 Claims, 14 Drawing Sheets

SEOUL CITY

PUSAN CITY

FIG.7a

COUNTRY CODE 1 (GERMANY)

| BROADCASTING STATION NAME | GUIDE CHANNEL NUMBER | CHANNEL POSITION |
|---|---|---|
| ARD | 001 | |
| ZDF | 002 | |
| SAT1 | 003 | |
| RTL | 004 | |
| ARTE | 010 | |
| TF1 | 093 | |
| FRANCE2 | 094 | |
| FRANCE3 | 095 | |

FIG.7b

COUNTRY CODE 2 (FRANCE)

| BROADCASTING STATION NAME | GUIDE CHANNEL NUMBER | CHANNEL POSITION |
|---|---|---|
| ARD | 119 | |
| ZDF | 015 | |
| SAT1 | 116 | |
| RTL | 115 | |
| ARTE | 005 | |
| TF1 | 001 | |
| FRANCE2 | 002 | |
| FRANCE3 | 003 | |

APPARATUS AND METHOD FOR PERFORMING RESERVATION-RECORDING OF VIDEO CASSETTE RECORDER

BACKGROUND OF THE INVENTION

The present invention relates in general to reservation-recording of a video cassette recorder (referred to hereinafter as VCR), and more particularly to an apparatus and a method for performing the reservation-recording of the VCR using a G code.

Typically, a G code is shown in a broadcasting program guide publication and used to reservation-record a desired broadcasting program in a VCR. The G code includes coded reservation-recording information for the purpose of provision of a convenience in the reservation-recording of the VCR.

The G code was developed by the name of GEMSTAR VCR PLUS by GEMSTAR Company in the beginning step. The G code is comprised of a plurality of figures, which contain reservation-recording information regarding a single broadcasting program, such as a guide channel number of a broadcasting station, a recording time, a date, a recording length and etc.

A length or the number of bits of the G code is typically 4-8 EA for the reservation-recording of the VCR although it may be somewhat different every program. The user can readily transfer reservation-recording information of a desired broadcasting program to the VCR by applying the corresponding G code to the VCR using figure keys on a remote controller or a VCR panel. The input of the reservation-recording information of the desired broadcasting program to the VCR using the G code can be performed by pushing about 4-8 of the figure keys. Therefore, the reservation-recording information of the desired broadcasting program can conveniently be applied to the VCR.

Referring to FIG. 1, there is shown a block diagram of a conventional apparatus for performing the reservation-recording of the VCR using the G code. As shown in this drawing, the conventional reservation-recording apparatus comprises a key input signal receiver 1 for receiving the G code and guide channel mapping signals which are applied by the user, a controller 2 for controlling a VCR system, and a key input signal discriminator 3 for converting a key input signal or the G code from the key input signal receiver 1 into reservation-recording data under the control of the controller 2. The reservation-recording data contains a guide channel number, a recording start time, a recording length and etc.

A reservation-recording data storage unit 4 is provided in the conventional reservation-recording apparatus to store the reservation-recording data from the key input signal discriminator 3 and output the stored reservation-recording data under the control of the controller 2.

A tuner 5 is also provided in the conventional reservation-recording apparatus to receive a broadcasting signal of the reserved channel number on the basis of the reservation-recording data stored in the reservation-recording data storage unit 4 if the present time reaches the recording start time.

Also, the conventional reservation-recording apparatus comprises a recording section 6 for recording the broadcasting signal from the tuner 5 on a recording medium on the basis of the reservation-recording data stored in the reservation-recording data storage unit 4 if the present time reaches the recording start time, an on-screen display (OSD) unit 7 for performing an OSD function under the control of the controller 2, and a memory 8 for storing guide channel mapped information under the control of the controller 2.

The operation of the conventional reservation-recording apparatus for the VCR with the above-mentioned construction will hereinafter be described with reference to FIG. 2, FIG. 3A and FIG. 3B. FIG. 2 is a flowchart illustrating the operation of the conventional reservation-recording apparatus and FIGS. 3A and 3B are mapping diagrams of guide channel numbers by regions stored in the memory 8.

First, using keys on a remote controller or a VCR panel (not shown), the user must map accurate guide channel numbers by broadcasting stations and store the mapped information into the memory 8. For example, in Seoul region in Korea, MBC broadcasting station is mapped into 11, KBS I broadcasting station is mapped into 9, KBS II broadcasting station is mapped into 7 and SBS broadcasting station is mapped into 6, as shown in FIG. 3A. The mapped information are then stored in the memory 8. Also, in Pusan region in Korea, as shown in FIG. 3B, the MBC broadcasting station is mapped into 9, the KBS I broadcasting station is mapped into 13, the KBS II broadcasting station is mapped into 5 and the SBS broadcasting station is mapped into 7. The mapped information are then stored in the memory 8.

Then, the controller 2 checks whether the key input signal receiver 1 receives the G code. Upon checking that the key input signal receiver 1 receives the G code, the controller 2 transfers the received G code from the key input signal receiver 1 to the key input signal discriminator 3. Under the control of the controller, the key input signal discriminator 3 converts the G code from the key input signal receiver 1 into the reservation-recording data containing the broadcasting station guide channel number, the date, the recording start time, the recording length and etc. The reservation-recording data from the key input signal discriminator 3 is stored in the reservation-recording data storage unit 4 under the control of the controller 2. At this time, the controller 2 substitutes the broadcasting station guide channel number of the reservation-recording data with the mapped channel number stored in the memory 8 and then stores the substituted channel number into the reservation-recording data storage unit 4.

Then, the controller 2 checks whether the present time is the recording start time. If it is checked that the present time is the recording start time, the controller 2 controls the reservation-recording data storage unit 4 to perform the reservation-recording through the recording section 6 and the tuner 5. In this manner, the reservation-recording of the desired broadcasting program can accurately be performed in the VCR.

By the way, the guide channel number of the G code corresponds to a single region and present channel numbers by regions are actually different. For example, in Korea, the broadcasting signal from the MBC broadcasting station is tuned to the channel number 11 in the Seoul region and to the channel number 9 in the Pusan region as shown in FIGS. 3A and 3B. On the other hand, the broadcasting station channel number of the G code is coded on the basis of the Seoul city as a capital city of Korea. For this reason, in the case where the user executes the reservation-recording of the VCR using the G code corresponding to the Seoul city in the Pusan city, he must map the present guide channel numbers suitably to the Pusan region as shown in FIG. 3B and store the mapped information into the memory 8. Provided that the present guide channel numbers are not mapped suitably to the Pusan region, no broadcasting signal will be recorded because the recording is performed according to the actual channel numbers of the Seoul region. In this connection, the conventional reservation-recording apparatus for the VCR with the key input signal discriminator has a disadvantage in that the user must map the different present guide channel numbers by regions with an inconvenience. Also, in the case where the mapped present guide channel numbers are erased due to interruption of electric power, the user has to map the present guide channel numbers again.

SUMMARY OF THE INVENTION

Therefore, the present invention has been made in view of the above problems, and it is an object of the present invention to provide an apparatus and a method for performing reservation-recording of a VCR in which the reservation-recording can conveniently be performed using a G code regardless of regions in which the VCR is used.

In accordance with one aspect of the present invention, there is provided an apparatus for performing reservation-recording of a video cassette recorder, comprising G code input means for inputting a G code; first memory means for storing channel positions and tuning data; second memory means for storing broadcasting station codes and names; decoding means for converting the G code from said G code input means into reservation-recording data containing a guide channel number; control means for controlling the reservation-recording of the video cassette recorder in response to outputs from said first and second memory means and said decoding means; tuning means for tuning a broadcasting signal under the control of said control means; pilot signal detection means for detecting a pilot signal from the tuned broadcasting signal from said tuning means and outputting the detected pilot signal to said control means; recording means for recording the tuned broadcasting signal from said tuning means under the control of said control means; third memory means for storing the broadcasting station names and guide channel numbers corresponding thereto, said third memory means storing desired ones of the channel positions from said first memory means under the control of said control means, said desired channel positions stored in said third memory means corresponding to the broadcasting station names stored therein, respectively; fourth memory means for storing the reservation-recording data from said decoding means and a desired one of the channel positions from said third memory means under the control of said control means, said desired channel position stored in said fourth memory means corresponding to the guide channel number of the reservation-recording data from said decoding means; and on-screen display means for performing an on-screen display function under the control of said control means.

In accordance with another aspect of the present invention, there is provided an apparatus for performing reservation-recording of a video cassette recorder, comprising G code input means for inputting a G code; first memory means for storing channel positions and tuning data; second memory means for storing broadcasting station codes and names; decoding means for converting the G code from said G code input means into reservation-recording data containing a guide channel number; control means for controlling the reservation-recording of the video cassette recorder in response to outputs from said first and second memory means and said decoding means; tuning means for tuning a broadcasting signal under the control of said control means; pilot signal detection means for detecting a pilot signal from the tuned broadcasting signal from said tuning means and outputting the detected pilot signal to said control means; recording means for recording the tuned broadcasting signal from said tuning means under the control of said control means; auto gain control level detection means for detecting an auto gain control level from the tuned broadcasting signal from said tuning means; third memory means for storing desired ones of the channel positions from said first memory means, desired ones of the broadcasting station names from said second memory means and the auto gain control levels from said auto gain control level detection means under the control of said control means, said desired channel positions stored in said third memory means corresponding to the desired broadcasting station names and the auto gain control levels stored therein, respectively; fourth memory means for storing the broadcasting station names and guide channel numbers corresponding thereto, said fourth memory means storing desired ones of the channel positions from said third memory means under the control of said control means, said desired channel positions stored in said fourth memory means corresponding to the broadcasting station names stored therein, respectively; fifth memory means for storing the reservation-recording data from said decoding means and a desired one of the channel positions from said fourth memory means under the control of said control means, said desired channel position stored in said fifth memory means corresponding to the guide channel number of the reservation-recording data from said decoding means; and on-screen display means for performing an on-screen display function under the control of said control means.

In accordance with a further aspect of the present invention, there is provided an apparatus for performing reservation-recording of a video cassette recorder, comprising G code input means for inputting a G code; first memory means for storing channel positions and tuning data; second memory means for storing broadcasting station names, guide channel numbers and channel positions by region codes; decoding means for converting the G code from said G code input means into reservation-recording data containing a guide channel number; control means for controlling the reservation-recording of the video cassette recorder in response to outputs from said first and second memory means and said decoding means; tuning means for tuning a broadcasting signal under the control of said control means; recording means for recording the tuned broadcasting signal from said tuning means under the control of said control means; third memory means for storing the reservation-recording data from said decoding means and a desired one of the channel positions from said second memory means under the control of said control means, said desired channel position stored in said third memory means corresponding to the guide channel number of the reservation-recording data from said decoding means; and on-screen display means for performing an on-screen display function under the control of said control means.

In accordance with a still further aspect of the present invention, there is provided a method of performing reservation-recording of a video cassette recorder, comprising the steps of (a) mapping channel positions on the basis of guide channel numbers and broadcasting station names; (b) inputting a G code for the reservation-recording and discriminating a guide channel number of reservation-recording information of the inputted G code; (c) finding the same one of the guide channel numbers of the channel positions mapped at said step (a) as the guide channel number of the G code discriminated at said step (b) and substituting the found guide channel number with the corresponding channel position; (d) storing the substituted channel position and the remaining reservation-recording information of the G code; and (e) performing a recording operation according to the stored channel position and reservation-recording information.

In accordance with another aspect of the present invention, there is provided a method of performing reservation-recording of a video cassette recorder, comprising the steps of (a) storing broadcasting station names, guide channel numbers and channel positions by region codes; (b) selecting a desired one of the region codes to select the broadcasting station names, the guide channel numbers and the channel positions of a desired region; (c) inputting a G code for the reservation-recording and discriminating a guide channel number of reservation-recording information of the inputted G code; (d) finding the same one of the guide channel numbers stored at said step (a) as the guide channel number of the G code discriminated at said step (c) and substituting the found guide channel number with the corresponding channel position; (e) storing the substituted channel position and the remaining reservation-recording information of the G code; and (f) performing a recording operation according to the stored channel position and reservation-recording information.

BRIEF DESCRIPTION OF THE DRAWINGS

The above and other objects, features and advantages of the present invention will be more clearly understood from the following detailed description taken in conjunction with the accompanying drawings, in which:

FIGS. 7A and 7B are mapping diagrams of country codes stored in a third memory in the apparatus in FIG. 6;

FIGS. 12A and 12B are flowcharts illustrating a method of performing the reservation-recording of the VCR in accordance with the fourth embodiment of the present invention.

DETAILED DESCRIPTION OF THE PREFERRED EMBODIMENTS

Figure 1:
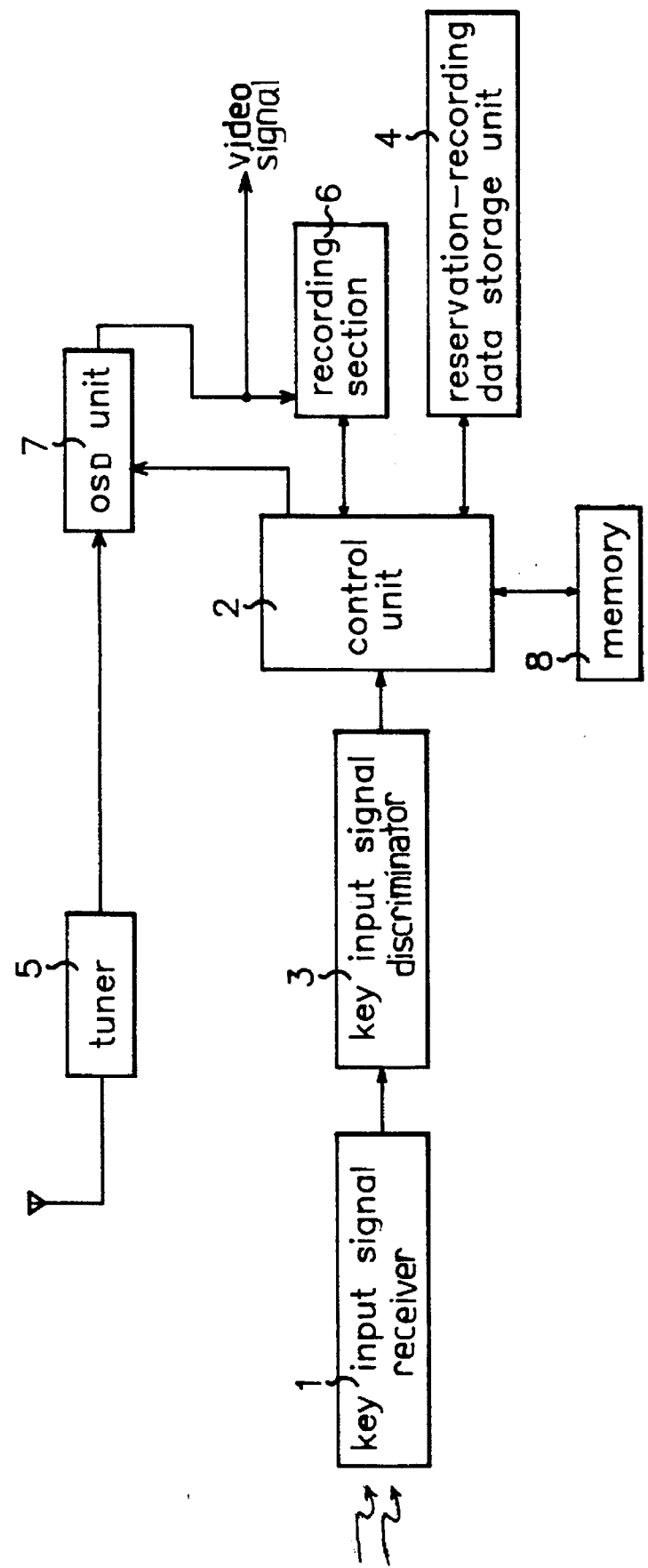
FIG. 1 is a block diagram of a conventional apparatus for performing reservation-recording of a VCR using a G code.
Figure 2:
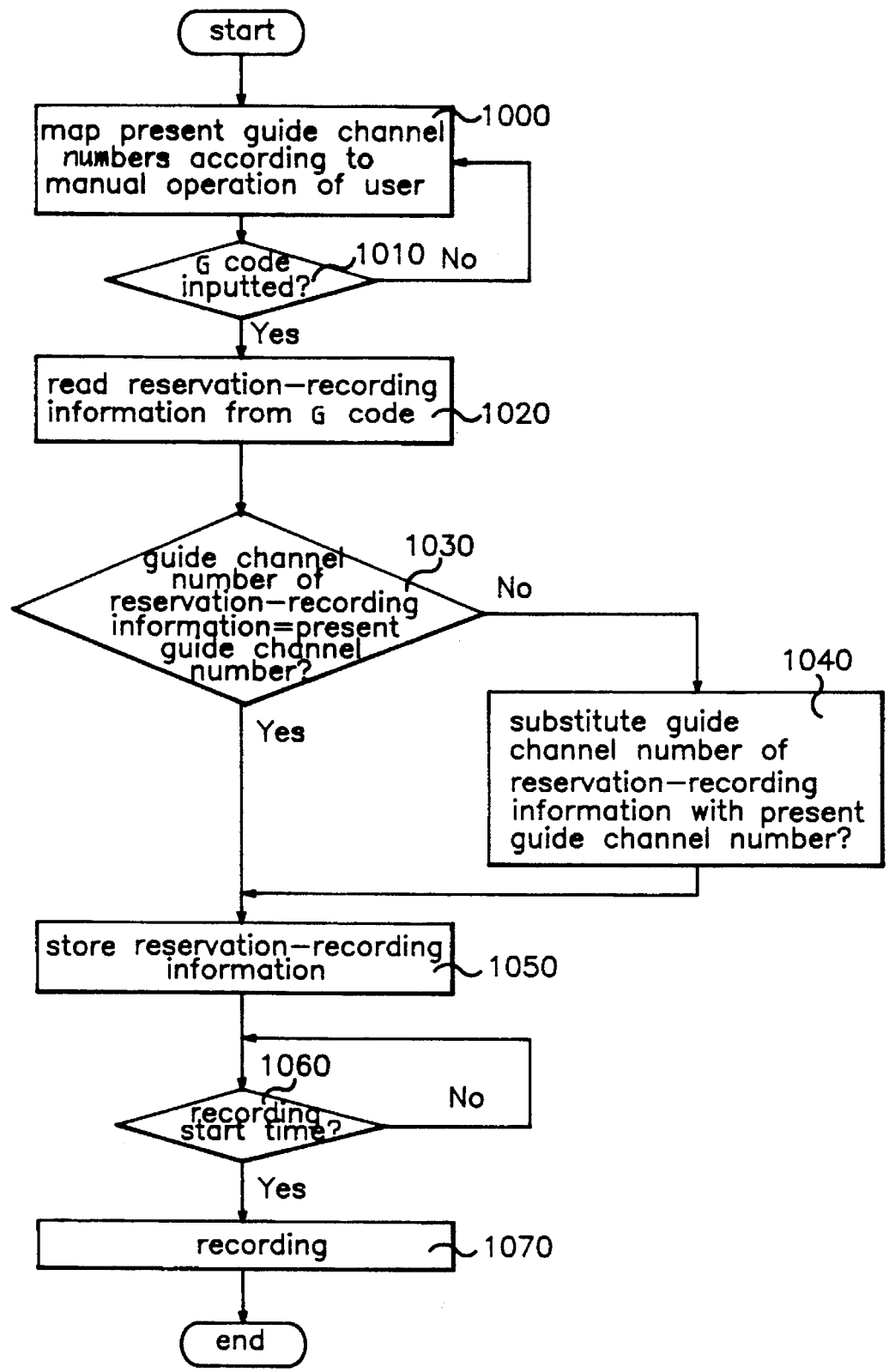
FIG. 2 is a flowchart illustrating an operation of the conventional apparatus in FIG. 1.
Figure 3A:
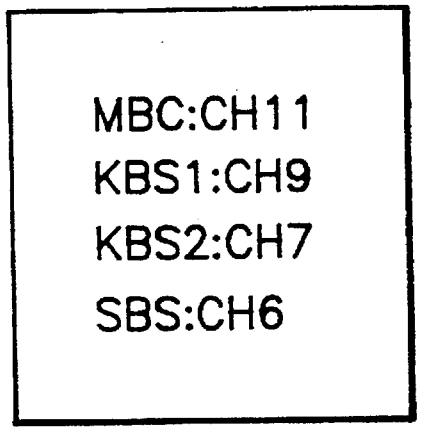
FIGS. 3A and 3B are mapping diagrams of guide channel numbers by regions stored in a memory in the conventional apparatus in FIG. 1.
Figure 3B:
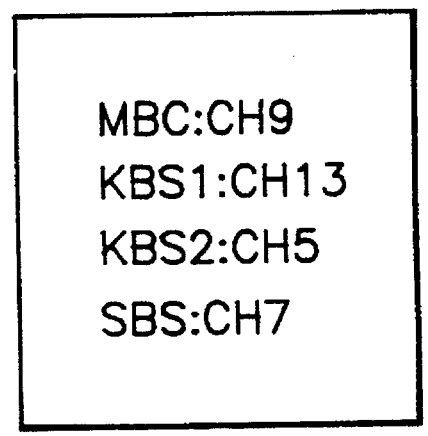
Figure 4:
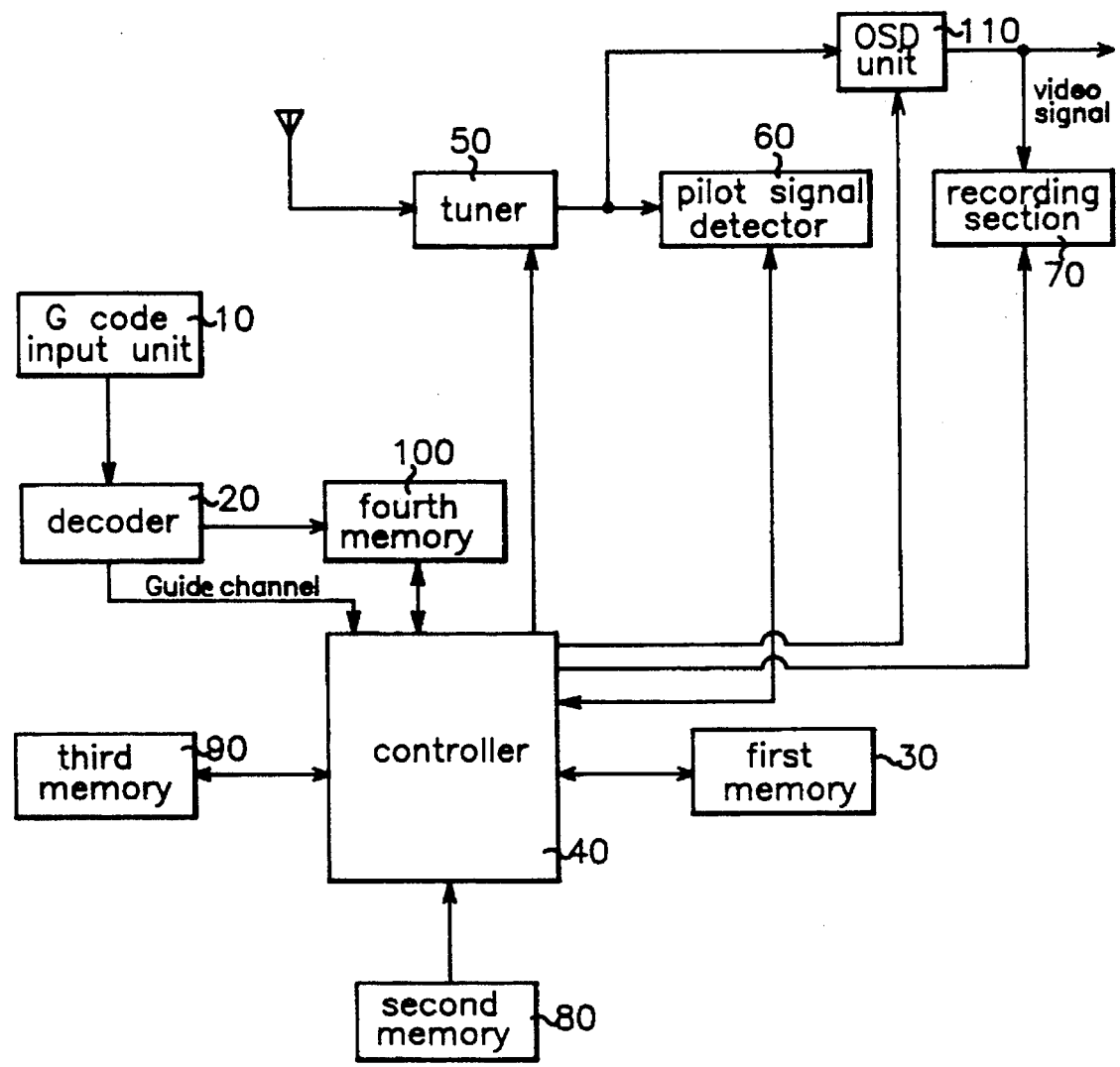
FIG. 4 is a block diagram of an apparatus for performing reservation-recording of a VCR in accordance with a first embodiment of the present invention.

Referring to FIG. 4, there is shown a block diagram of an apparatus for performing reservation-recording of a VCR in accordance with a first embodiment of the present invention. As shown in this drawing, the reservation-recording apparatus comprises a G code input unit 10, first to fourth memories 30, 80, 90 and 100, a decoder 20, a controller 40, a tuner 50, a pilot signal detector 60, a recording section 70 and an OSD unit 110. In accordance with the first embodiment of the present invention, the reservation-recording apparatus executes a mapping operation based on an automatic channel position search function to perform the reservation-recording of the VCR.

The G code input unit 10 inputs a G code provided by the user. The first memory 30 stores channel positions and tuning data.

The second memory 80 stores broadcasting station codes and names. The decoder 20 converts the G code from the G code input unit 10 into reservation-recording data containing a broadcasting station guide channel number, a recording start time, a date, a recording length and etc.

The tuner 50 tunes a broadcasting signal according to the tuning data stored in the first memory 30 under the control of the controller 40. The pilot signal detector 60 detects a pilot signal containing a broadcasting station code from the tuned broadcasting signal from the tuner 50 and outputs the detected pilot signal to the controller 40. The pilot signal is transmitted being placed in a vertical blanking interval (VBI) of the broadcasting signal.

The recording section 70 is adapted to record the tuned broadcasting signal from the tuner 50 under the control of the controller 40 if the present time reaches the recording start time.

The third memory 90 stores the broadcasting station names and guide channel numbers corresponding thereto. Also, the third memory 90 stores desired ones of the channel positions from the first memory 30 under the control of the controller 40. The desired channel positions stored in the third memory 90 correspond to the broadcasting station names stored therein, respectively.

The fourth memory 100 is adapted to store the recording start time, the date, the recording length of the reservation-recording data from the decoder 20 and a desired one of the channel positions from the third memory 90 under the control of the controller 40. The desired channel position stored in the fourth memory 100 corresponds to the guide channel number of the reservation-recording data from the decoder 20.

The OSD unit 110 is adapted to perform an OSD function under the control of the controller 40.

The controller 40 is adapted to control the tuner 50, the recording section 70, the third and fourth memories 90 and 100 and the OSD unit 110 in response to the outputs from the first and second memories 30 and 80, the decoder 20 and the pilot signal detector 60.

The operation of the reservation-recording apparatus for the VCR with the above-mentioned construction in accordance with the first embodiment of the present invention will hereinafter be described in detail with reference to FIG. 4.

First, upon receiving the channel position and the tuning data regarding an actual channel number, outputted from the first memory 30, the controller 40 operates the tuner 50 according to the received tuning data. Under the control of the controller 40, the tuner 50 tunes the broadcasting signal and outputs the tuned broadcasting signal to the pilot signal detector 60.

The pilot signal detector 60 detects the pilot signal containing the broadcasting station code from the tuned broadcasting signal from the tuner 50 and outputs the detected pilot signal to the controller 40. The controller 40 receives the detected pilot signal from the pilot signal detector 60 and compares the broadcasting station code of the received pilot signal with the broadcasting station codes stored in the second memory 80 to find the corresponding broadcasting station name.

Then, the controller 40 maps the channel position on the basis of the found broadcasting station name and stores the mapped channel position into the third memory 90. In this manner, the mapping operation for the third memory 90 is repeatedly performed on the basis of all the tuning data and the channel positions stored in the first memory 30.

Upon receiving the G code through the G code input unit 10 under the condition that the channel position mapping operation is completed on the basis of all the tuning data and the channel positions stored in the first memory 30, the decoder 20 decodes the received G code into the reservation-recording data containing the recording start time, the date, the recording length and the guide channel number. Then, the recording start time, the date and the recording length of the reservation-recording data from the decoder 20 are stored into the fourth memory 100 and the guide channel number thereof is applied to the controller 40. The guide channel number from the decoder 20 corresponds to a broadcasting station to which a broadcasting signal to be recorded belongs.

The controller 40 finds the same one of the guide channel numbers stored in the third memory 90 as the guide channel number from the decoder 20 and substitutes the found guide channel number with the corresponding channel position stored in the third memory 90. The substituted channel position is then stored into the fourth memory 100.

Thereafter, when the present time reaches the recording start time of the reservation-recording data stored in the fourth memory 100 or upon receiving a recording start control signal from a broadcasting station, the controller 40 reads the tuning data corresponding to the channel position stored in the fourth memory 100, from the first memory 30, and operates the tuner 50 according to the read tuning data. Then, the controller 40 controls the recording section 70 to record the tuned broadcasting signal from the tuner 50.

Figure 5A:
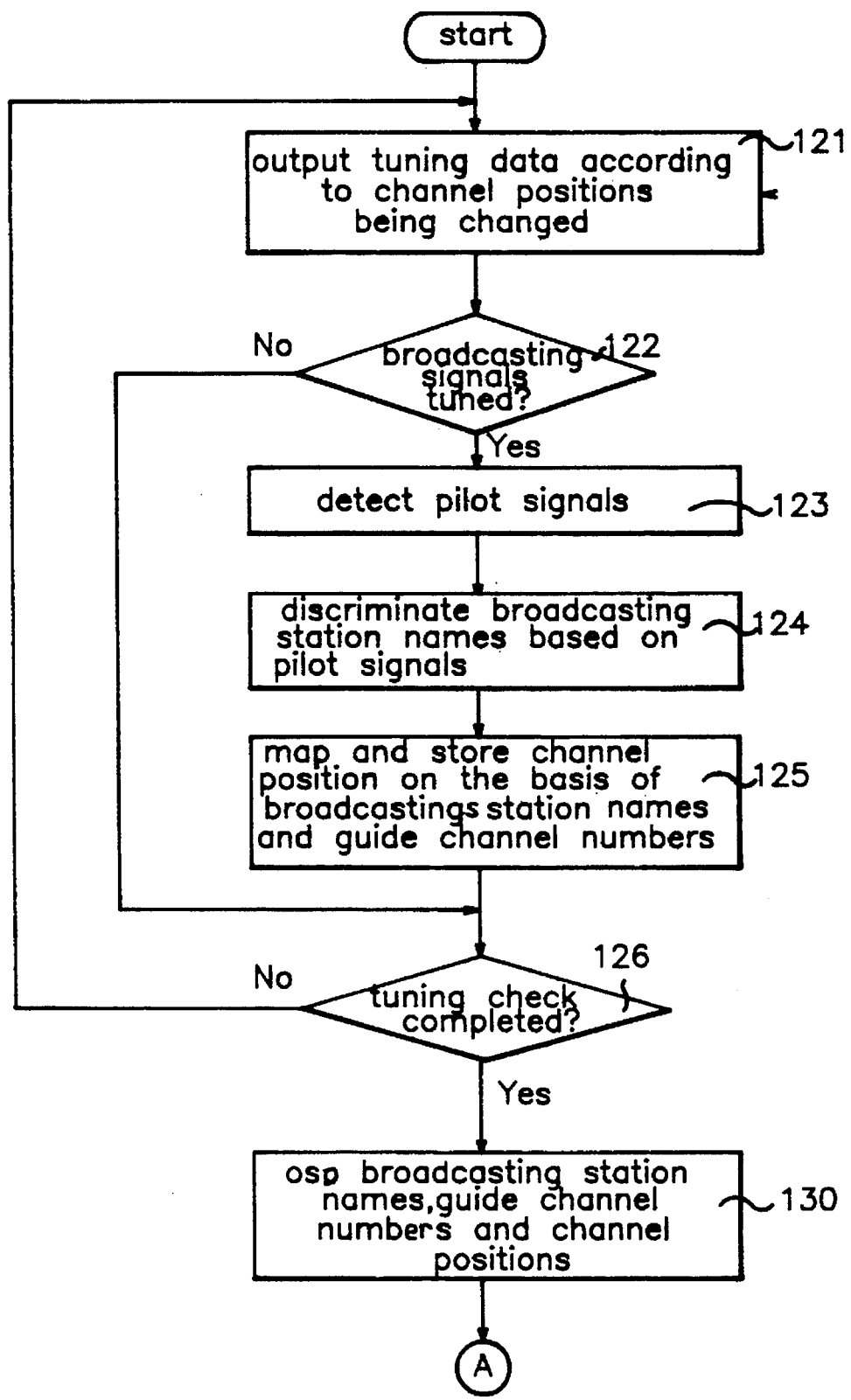
FIGS. 5A and 5B are flowcharts illustrating a method of performing the reservation-recording of the VCR in accordance with the first embodiment of the present invention.
Figure 5B:
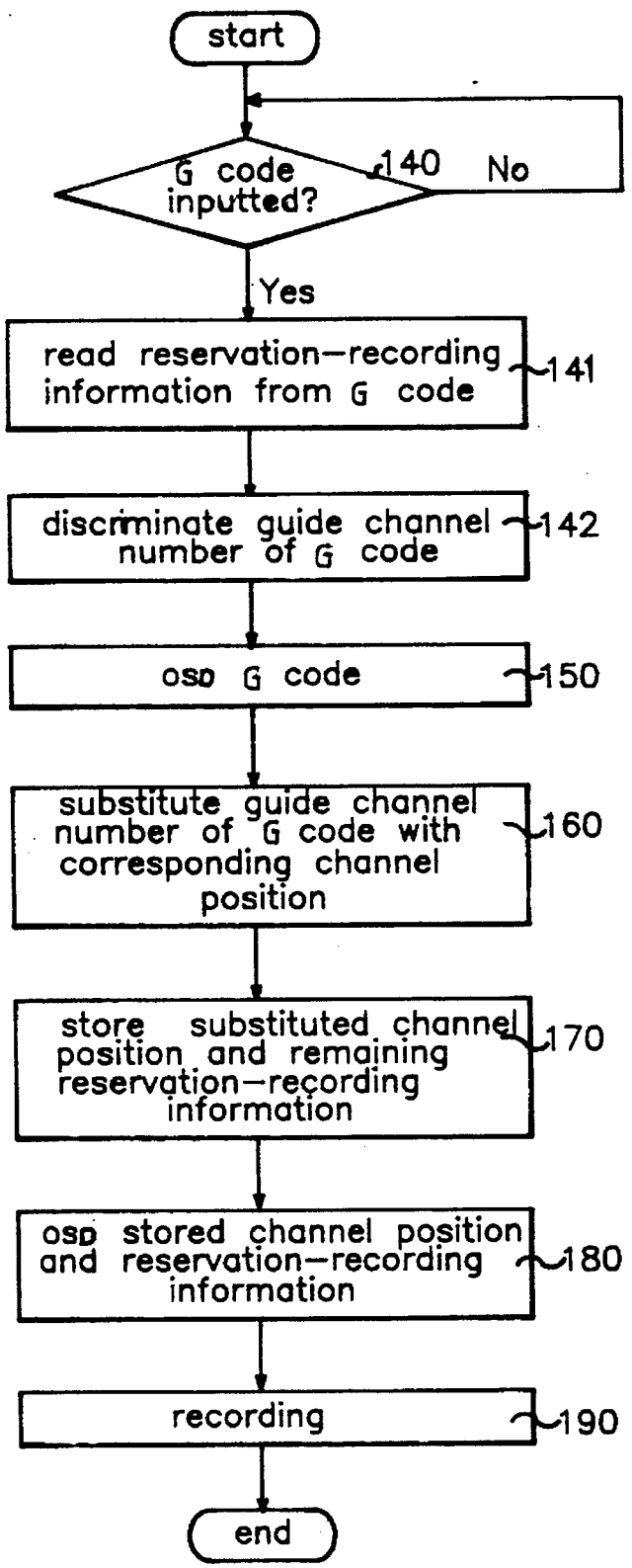

Referring to FIGS. 5A and 5B, there are shown flowcharts illustrating a method of performing the reservation-recording of the VCR in accordance with the first embodiment of the present invention. In accordance with the first embodiment of the present invention, the reservation-recording method is to perform the reservation-recording of the VCR utilizing the automatic channel position search function.

First, the channel positions are mapped on the basis of the guide channel numbers and the broadcasting station names. Namely, the broadcasting signals by the channel positions are sequentially tuned and the pilot signals are detected from the tuned broadcasting signals, respectively. The broadcasting station names are discriminated based on the detected pilot signals. Then, the channel positions are mapped and stored on the basis of the discriminated broadcasting station names and the corresponding guide channel numbers.

In other words, the tuning data are sequentially outputted according to the channel positions being changed, at the step 121, and it is checked at the step 122 whether the broadcasting signals are tuned according to the tuning data. If it is checked at the step 122 that the broadcasting signals are tuned according to the tuning data, the pilot signals are detected from the tuned broadcasting signals at the step 123 and the broadcasting station names are discriminated based on the detected pilot signals at the step 124. Then, the channel positions are mapped and stored on the basis of the discriminated broadcasting station names and the corresponding guide channel numbers at the step 125.

After the mapping and storage of the channel positions or if no broadcasting signal is tuned, it is checked at the step 126 whether the tuning check of the broadcasting signals has been completed with respect to all the channel positions. If it is checked at the step 126 that the tuning check of the broadcasting signals has been completed with respect to all the channel positions, then the broadcasting station names, the guide channel numbers and the channel positions are displayed on the screen at the step 130, so that they can be recognized by the user. If not so, the operation returns to the step 121 to perform the tuning check of the broadcasting signals based on the change of the channel positions.

In the case where the G code is inputted for the reservation-recording after the mapping and storage of the channel positions, discrimination is performed with respect to the guide channel number of the inputted G code. Namely, it is checked at the step 140 whether the G code is inputted. If it is checked at the step 140 that the G code is inputted, the reservation-recording information is read from the inputted G code at the step 141 and the guide channel number of the read reservation-recording information is discriminated at the step 142. The inputted G code and the discriminated guide channel number are displayed on the screen at the step 150, so that the user can check whether the inputted G code is correct.

At the step 160, the discriminated guide channel number of the inputted G code is substituted with the channel position of the same one of the guide channel numbers about the broadcasting station names discriminated at the step 124. The substituted channel position and the read remaining reservation-recording information of the G code are stored at the step 170. The stored channel position and reservation-recording information are displayed on the screen at the step 180.

The recording operation is performed on the basis of the stored channel position and reservation-recording information at the step 190. Namely, when the present time reaches the recording start time of the stored reservation-recording information or the recording start control signal is transmitted from the broadcasting station, the tuning data corresponding to the stored channel position is outputted, the broadcasting signal is tuned according to the outputted tuning data and the tuned broadcasting signal is recorded.

Figure 6:
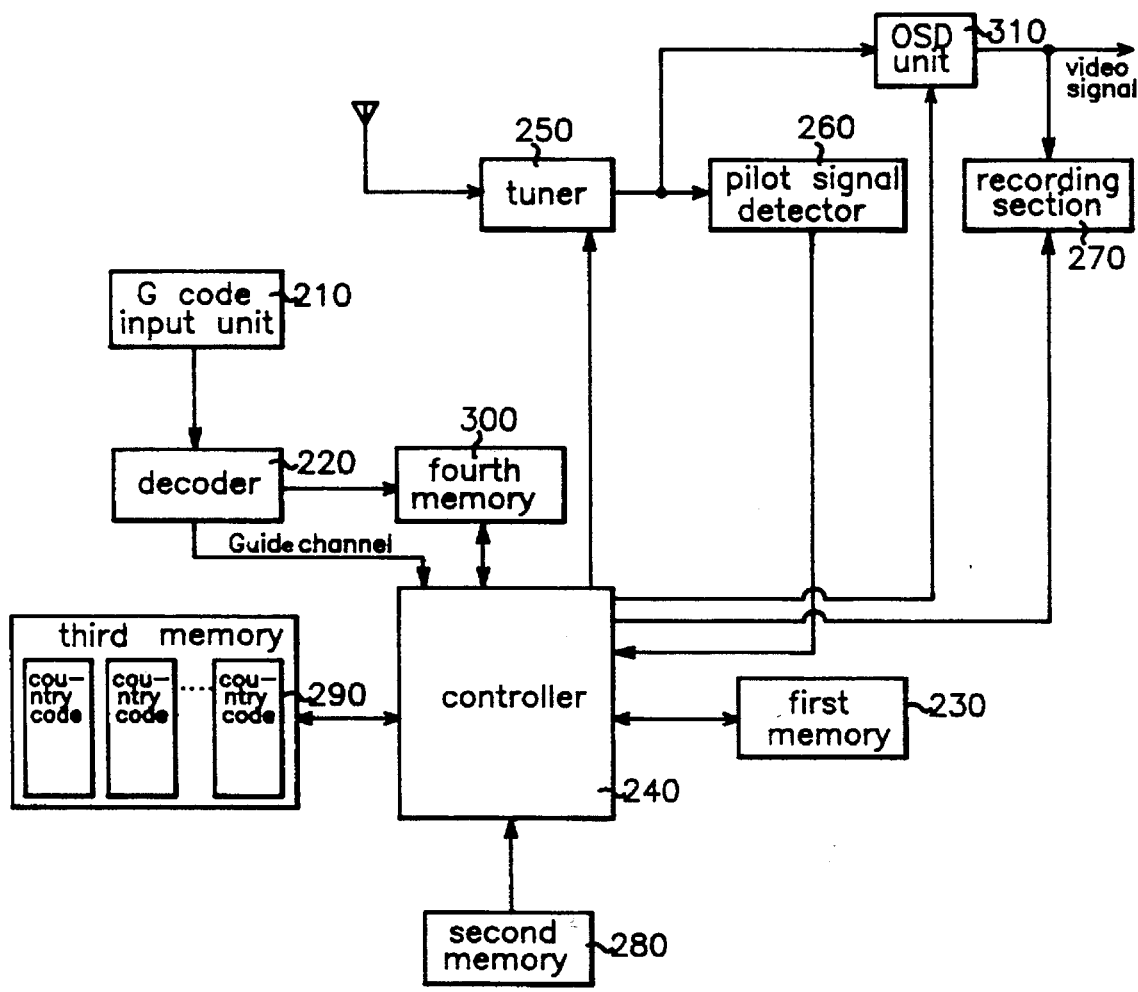
FIG. 6 is a block diagram of an apparatus for performing reservation-recording of a VCR in accordance with a second embodiment of the present invention.

Referring to FIG. 6, there is shown a block diagram of an apparatus for performing reservation-recording of a VCR in accordance with a second embodiment of the present invention. As shown in this drawing, the reservation-recording apparatus comprises a G code input unit 210, first to fourth memories 230, 280, 290 and 300, a decoder 220, a controller 240, a tuner 250, a pilot signal detector 260, a recording section 270 and an OSD unit 310. In accordance with the second embodiment of the present invention, the reservation-recording apparatus is adapted to map channel positions according to different guide channel numbers by countries to perform the reservation-recording of the VCR. The reservation-recording apparatus of the second embodiment of the present invention may readily be applied to a specified region in which the frontiers of countries are adjacent to one another and broadcasting signals of different countries are received, such as, for example, Europe.

The functions of the G code input unit 210, the first, second and fourth memories 230, 280 and 300, the decoder 220, the tuner 250, the recording section 270 and the OSD unit 310 in FIG. 6 are the same as those of the G code input unit 10, the first, second and fourth memories 30, 80 and 100, the decoder 20, the tuner 50, the recording section 70 and the OSD unit 110 in FIG. 4, respectively, and a detailed description thereof will thus be omitted.

In accordance with the second embodiment of the present invention, the pilot signal detector 260 is adapted to detect a pilot signal containing a broadcasting station code and a country code from the tuned broadcasting signal from the tuner 250 and output the detected pilot signal to the controller 240.

The third memory 290 stores the broadcasting station names by country codes and guide channel numbers corresponding thereto. Also, the third memory 290 stores desired ones of the channel positions from the first memory 230 under the control of the controller 240. The desired channel positions stored in the third memory 290 correspond to the broadcasting station names stored therein, respectively. To this end, the third memory 290 may include a plurality of memory elements grouped by the country codes.

The controller 240 is adapted to control the tuner 250, the recording section 270, the third and fourth memories 290 and 300 and the OSD unit 310 in response to the outputs from the first and second memories 230 and 280, the decoder 220 and the pilot signal detector 260. Noticeably, the controller 240 enables only one of the grouped memory elements in the third memory 290 corresponding to the inputted country code.

The operation of the reservation-recording apparatus for the VCR with the above-mentioned construction in accordance with the second embodiment of the present invention will hereinafter be described in detail with reference to FIG. 6 and FIGS. 7A and 7B, which are mapping diagrams of the country codes stored in the third memory 290.

First, upon receiving the channel position and the tuning data regarding an actual channel number, outputted from the first memory 230, the controller 240 operates the tuner 250 according to the received tuning data. Under the control of the controller 240, the tuner 250 tunes the broadcasting signal and outputs the tuned broadcasting signal to the pilot signal detector 260. The pilot signal detector 260 detects the pilot signal containing the country code and the broadcasting station code from the tuned broadcasting signal from the tuner 250 and outputs the detected pilot signal to the controller 240.

The controller 240 receives the detected pilot signal from the pilot signal detector 260 and compares the broadcasting station code of the received pilot signal with the broadcasting station codes stored in the second memory 280 to find the corresponding broadcasting station name.

Then, the controller 240 maps the channel position on the basis of the found broadcasting station name and stores the mapped channel position into the third memory 290. In this manner, the mapping operation for the third memory 290 is repeatedly performed on the basis of all the tuning data and the channel positions stored in the first memory 230.

As shown in FIGS. 7A and 7B, the broadcasting station names and the guide channel numbers are stored in the memory elements of the third memory 290, respectively, by the country codes. Hence, the channel positions can readily be mapped and stored in the respective memory elements of the third memory 290 on the basis of the broadcasting station names and the guide channel numbers of the respective memory elements.

After the mapping and storage of the channel positions into all the memory elements of the third memory 290, a desired one of the country codes is selected by the user. For example, the country code 1 is selected if Germany and the country code 2 is selected if France.

If the desired country code is selected by the user, the controller 240 enables only one of the grouped memory elements in the third memory 290 corresponding to the selected country code. As a result, the channel position mapping operation is completed.

Then, upon receiving the G code through the G code input unit 210, the decoder 220 decodes the received G code into the reservation-recording data. The recording start time, the date and the recording length of the reservation-recording data from the decoder 220 are stored into the fourth memory 300 and the guide channel number thereof is applied to the controller 240.

The controller 240 finds the same one of the guide channel numbers stored in the enabled memory element of the third memory 290 as the guide channel number from the decoder 220 and substitutes the found guide channel number with the corresponding channel position stored in the enabled memory element. Then, the controller 240 stores the substituted channel position into the fourth memory 300.

The subsequent recording procedure is the same as that in FIG. 4 and a description thereof will thus be omitted.

Figure 8:
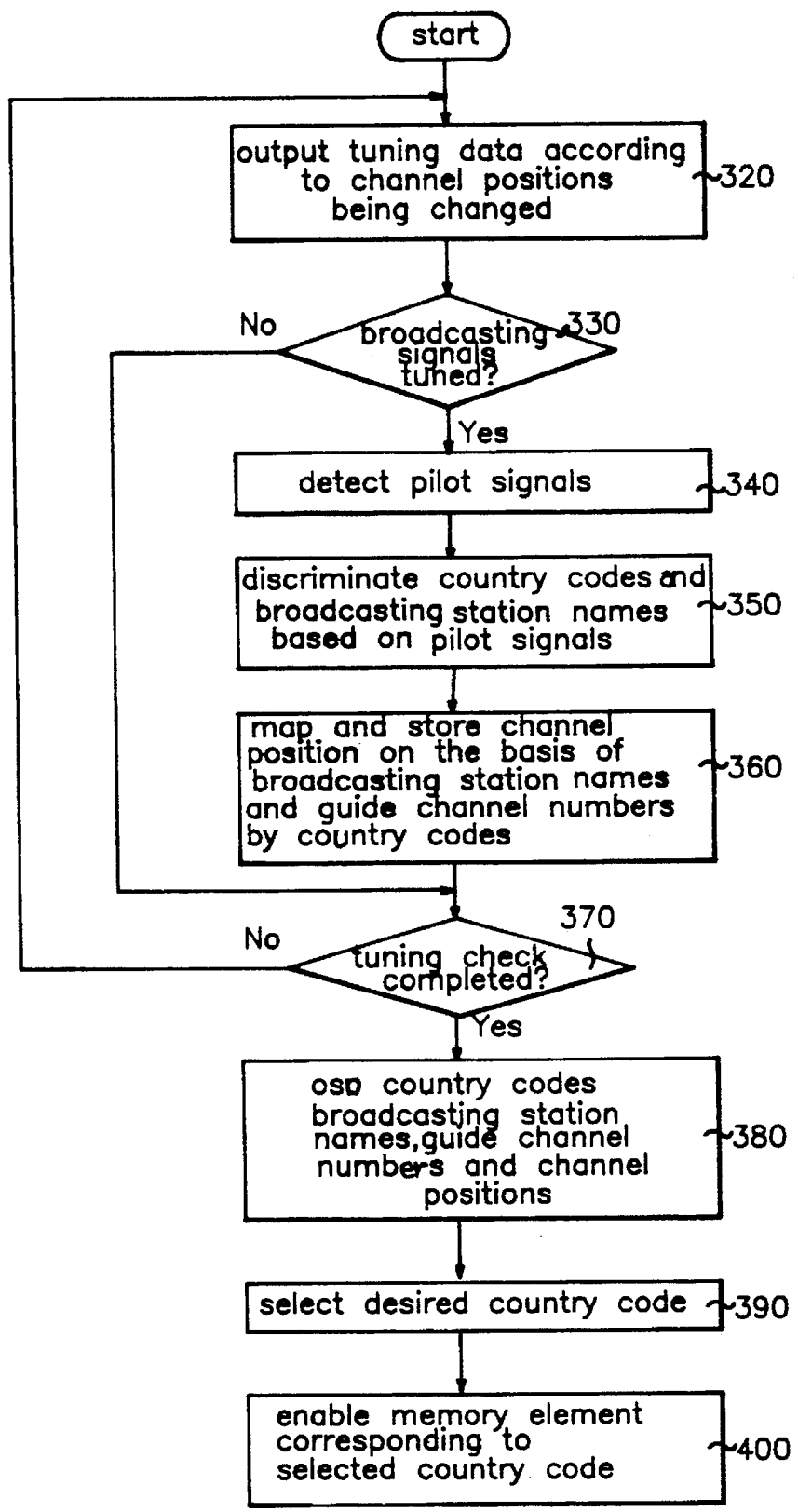
FIG. 8 is a flowchart illustrating a method of performing the reservation-recording of the VCR in accordance with the second embodiment of the present invention.

Referring to FIG. 8, there is shown a flowchart illustrating a method of performing the reservation-recording of the VCR in accordance with the second embodiment of the present invention. In accordance with the second embodiment of the present invention, the reservation-recording method is to perform the reservation-recording of the VCR utilizing the automatic channel position search function by the countries.

First, the broadcasting signals are sequentially tuned by the channel positions and the pilot signals are detected from the tuned broadcasting signals, respectively. Namely, the tuning data are sequentially outputted according to the channel positions being changed, at the step 320, and it is checked at the step 330 whether the broadcasting signals are tuned according to the tuning data. If it is checked at the step 330 that the broadcasting signals are tuned according to the tuning data, the pilot signals are detected from the tuned broadcasting signals at the step 340 and the country codes and the broadcasting station names are discriminated based on the detected pilot signals at the step 350.

Then, the channel positions are mapped and stored on the basis of the discriminated broadcasting station names and the corresponding guide channel numbers by the discriminated country codes at the step 360.

After the mapping and storage of the channel positions or if no broadcasting signal is tuned, it is checked at the step 370 whether the tuning check of the broadcasting signals has been completed with respect to all the channel positions. If it is checked at the step 370 that the tuning check of the broadcasting signals has been completed with respect to all the channel positions, then the country codes, the broadcasting station names, the guide channel numbers and the channel positions are displayed on the screen at the step 380, so that they can be recognized by the user. If not so, the operation returns to the step 320 to perform the tuning check of the broadcasting signals based on the change of the channel positions.

The desired country code is selected after the mapping and storage of the channel positions at the step 390 and only the memory element corresponding to the selected country code is enabled at the step 400. In other words, only the guide channel numbers and channel positions stored in the enabled memory element are available.

The subsequent recording procedure is the same as that in FIG. 5B and a description thereof will thus be omitted.

Figure 9:
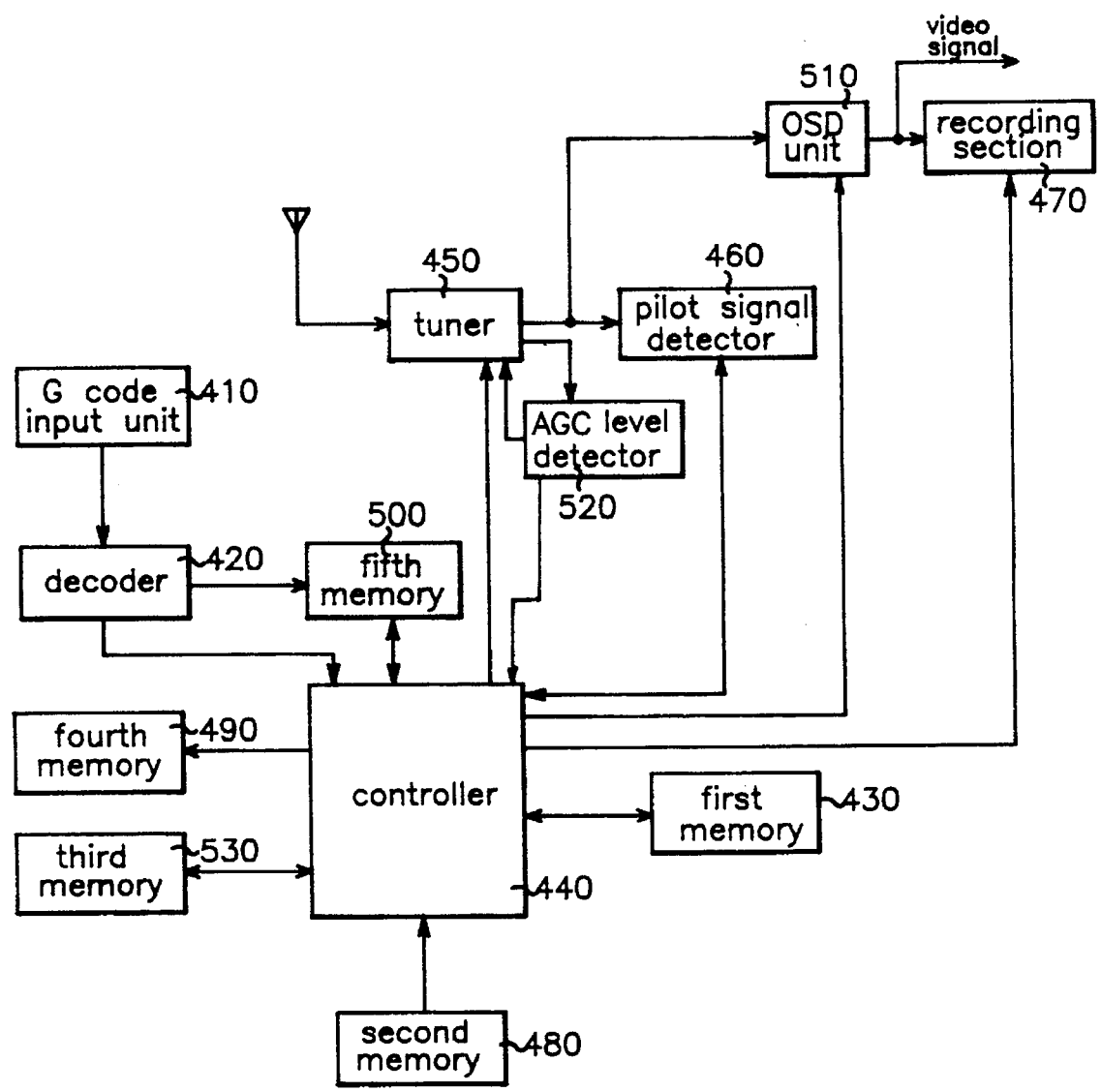
FIG. 9 is a block diagram of an apparatus for performing reservation-recording of a VCR in accordance with a third embodiment of the present invention.

Referring to FIG. 9, there is shown a block diagram of an apparatus for performing reservation-recording of a VCR in accordance with a third embodiment of the present invention. As shown in this drawing, the reservation-recording apparatus comprises a G code input unit 410, first to fifth memories 430, 480, 530, 490 and 500, a decoder 420, a controller 440, a tuner 450, a pilot signal detector 460, a recording section 470, an auto gain control (AGC) level detector 520 and an OSD unit 510. In accordance with the third embodiment of the present invention, the reservation-recording apparatus executes a mapping operation by performing an automatic channel position search function based on AGC levels.

The functions of the G code input unit 410, the first and second memories 430 and 480, the decoder 420, the tuner 450, the recording section 470, the pilot signal detector 460 and the OSD unit 510 in FIG. 9 are the same as those of the G code input unit 10, the first and second memories 30 and 80, the decoder 20, the tuner 50, the recording section 70, the pilot signal detector 60 and the OSD unit 110 in FIG. 4, respectively, and a detailed description thereof will thus be omitted.

In accordance with the third embodiment of the present invention, the AGC level detector 520 is adapted to detect an AGC level from the tuned broadcasting signal from the tuner 450.

The third memory 530 is adapted to store desired ones of the channel positions from the first memory 430, desired ones of the broadcasting station names from the second memory 480 and the AGC levels from the AGC level detector 520 under the control of the controller 440. The desired channel positions stored in the third memory 530 correspond to the desired broadcasting station names and the AGC levels stored therein, respectively.

The fourth memory 490 is adapted to store the broadcasting station names and guide channel numbers corresponding thereto. Also, the fourth memory 490 stores desired ones of the channel positions from the third memory 530 under the control of the controller 440. The desired channel positions stored in the fourth memory 490 correspond to the broadcasting station names stored therein, respectively.

The fifth memory 500 is adapted to store the recording start time, the date, the recording length of the reservation-recording data from the decoder 420 and a desired one of the channel positions from the fourth memory 490 under the control of the controller 440. The desired channel position stored in the fifth memory 500 corresponds to the guide channel number of the reservation-recording data from the decoder 420.

The controller 440 is adapted to control the tuner 450, the recording section 470, the third to fifth memories 520, 490 and 500 and the OSD unit 510 in response to the outputs from the first and second memories 430 and 480, the decoder 420, the pilot signal detector 460 and the AGC level detector 520. In particular, the controller 440 maps the channel positions according to the inputted AGC levels.

The operation of the reservation-recording apparatus for the VCR with the above-mentioned construction in accordance with the third embodiment of the present invention will hereinafter be described in detail with reference to FIG. 9.

First, upon receiving the channel position and the tuning data corresponding to an actual channel number, outputted from the first memory 430, the controller 440 operates the tuner 450 according to the received tuning data. The tuner 450 tunes the broadcasting signal under the control of the controller 440 and outputs the tuned broadcasting signal to the pilot signal detector 460 and the AGC level detector 440.

The pilot signal detector 460 detects the pilot signal containing the broadcasting station code from the tuned broadcasting signal from the tuner 450 and outputs the detected pilot signal to the controller 440. The AGC level detector 520 detects the AGC level from the tuned broadcasting signal from the tuner 450 and outputs the detected AGC level to the controller 440. The controller 440 receives the detected pilot signal from the pilot signal detector 460 and compares the broadcasting station code of the received pilot signal with the broadcasting station codes stored in the second memory 480 to find the corresponding broadcasting station name.

Then, the controller 440 stores the found broadcasting station name, the channel position corresponding thereto and the AGC level from the AGC level detector 520 into the third memory 530. In this manner, the storage operation for the third memory 530 is repeatedly performed on the basis of all the tuning data and the channel positions stored in the first memory 430.

Upon completion of the storage operation for the third memory 530, the controller 440 checks whether any ones of the channel positions correspond to the same one of the broadcasting station names stored in the third memory 530. If the channel positions for the same broadcasting station name are present, the controller 440 compares the AGC levels of the present channel positions with one another. In accordance with the compared result, the controller 440 erases the channel positions other than one of the lowest AGC level. Then, the controller 440 stores the channel position of the lowest AGC level into the fourth memory 490. Namely, the controller 440 maps the left channel position according to the corresponding broadcasting station name in the fourth memory 490. The above operation is repeatedly performed until only one of the channel positions corresponds to the same broadcasting station name. As a result, the mapping operation is completed.

Then, upon receiving the G code through the G code input unit 410, the decoder 420 decodes the received G code into the reservation-recording data containing the recording start time, the date, the recording length and the guide channel number. The recording start time, the date and the recording length of the reservation-recording data from the decoder 420 are stored into the fifth memory 500 and the guide channel number thereof is applied to the controller 440.

The controller 440 finds the same one of the guide channel numbers stored in the fourth memory 490 as the guide channel number from the decoder 420 and substitutes the found guide channel number with the corresponding channel position stored in the fourth memory 490. The substituted channel position is then stored into the fifth memory 500.

The subsequent recording procedure is the same as that in FIG. 4 and a description thereof will thus be omitted.

Figure 10:
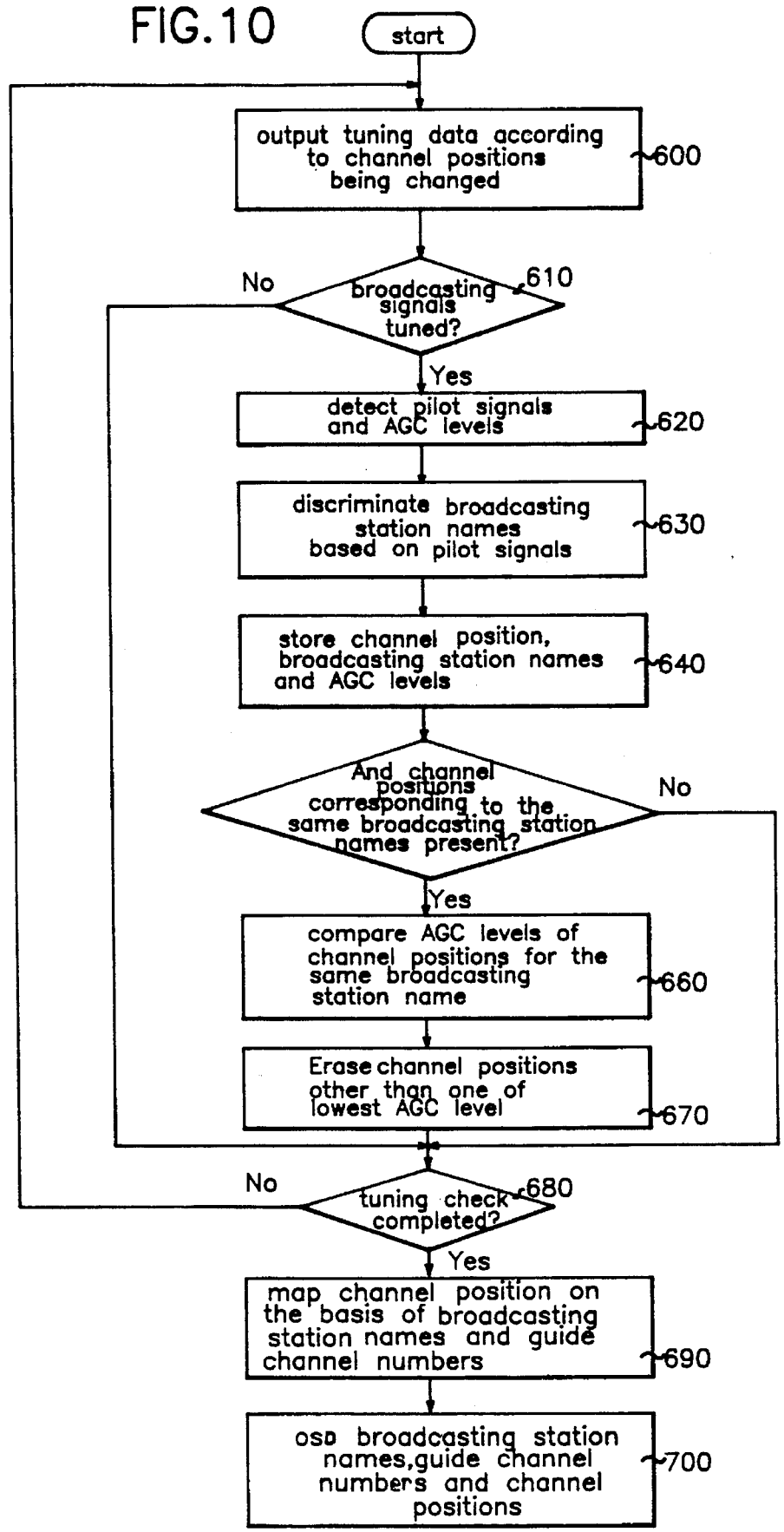
FIG. 10 is a flowchart illustrating a method of performing the reservation-recording of the VCR in accordance with the third embodiment of the present invention.

Referring to FIG. 10, there is shown a flowchart illustrating a method of performing the reservation-recording of the VCR in accordance with the third embodiment of the present invention. In accordance with the third embodiment of the present invention, the reservation-recording method is to perform the reservation-recording of the VCR utilizing the automatic channel position search function based on the AGC levels.

First, the broadcasting signals are sequentially tuned by the channel positions, and the pilot signals and the AGC levels are detected from the tuned broadcasting signals, respectively. Namely, the tuning data are sequentially outputted according to the channel positions being changed, at the step 600, and it is checked at the step 610 whether the broadcasting signals are tuned according to the tuning data. If it is checked at the step 610 that the broadcasting signals are tuned according to the tuning data, the pilot signals and the AGC levels are detected from the tuned broadcasting signals at the step 620, respectively, and the broadcasting station names are discriminated based on the detected pilot signals at the step 630.

Stored at the step 640 are the discriminated broadcasting station names, the channel positions corresponding thereto and the AGC levels. It is checked at the step 650 whether any ones of the channel positions correspond to the same broadcasting station name. If it is checked at the step 650 that the channel positions for the same broadcasting station name are present, the AGC levels of the present channel positions are compared with one another at the step 660. The channel positions other than one of the lowest AGC level are erased in accordance with the compared result at the step 670.

After the channel positions other than one of the lowest AGC level are erased, or when only one of the channel positions corresponds to the same broadcasting station name or when no broadcasting signal is tuned, it is checked at the step 680 whether the tuning check of the broadcasting signals has been completed with respect to all the channel positions. If it is checked at the step 680 that the tuning check of the broadcasting signals has been completed with respect to all the channel positions, the channel positions are mapped and stored on the basis of the discriminated broadcasting station names and the corresponding guide channel numbers at the step 690. Then, the broadcasting station names, the guide channel numbers and the channel positions are displayed on the screen at the step 700, so that they can be recognized by the user.

If it is checked at the step 680 that the tuning check of the broadcasting signals has not been completed, the operation returns to the step 600 to perform the tuning check of the broadcasting signals based on the change of the channel positions.

The subsequent recording procedure is the same as that in FIG. 5B and a description thereof will thus be omitted.

Figure 11:
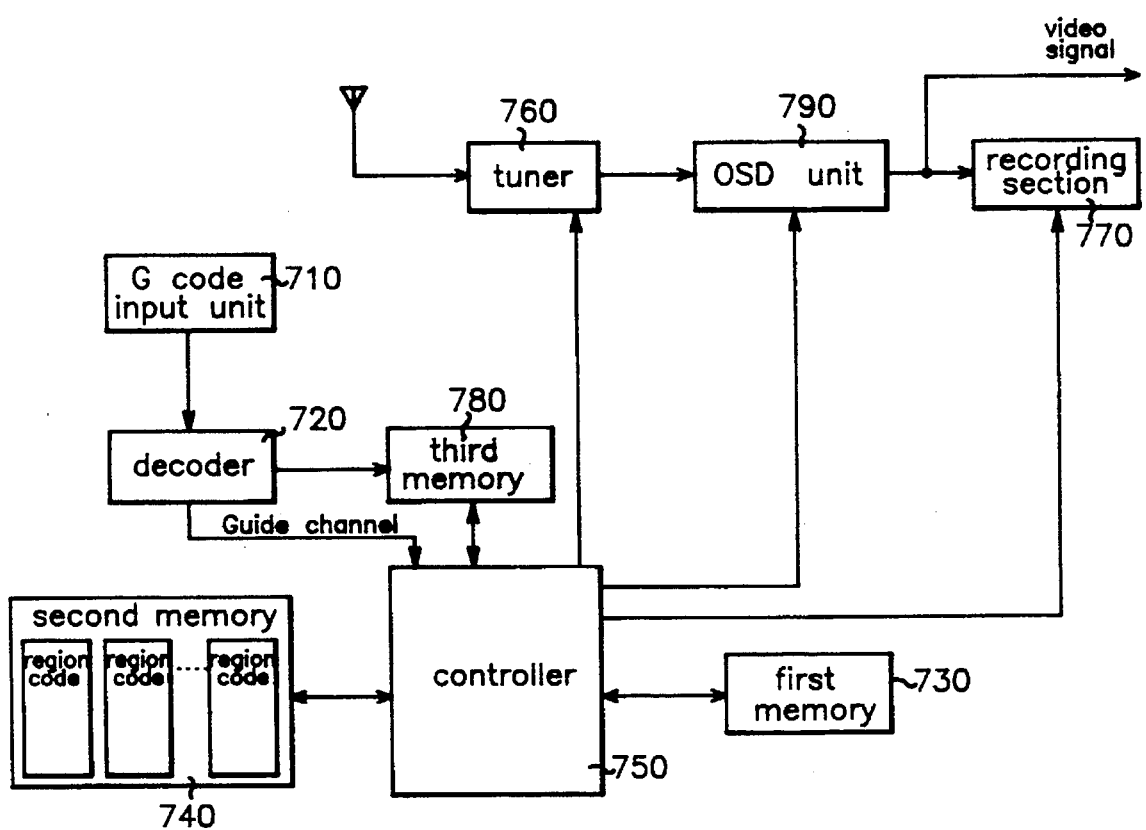
FIG. 11 is a block diagram of an apparatus for performing reservation-recording of a VCR in accordance with a fourth embodiment of the present invention.

Referring to FIG. 11, there is shown a block diagram of an apparatus for performing reservation-recording of a VCR in accordance with a fourth embodiment of the present invention. As shown in this drawing, the reservation-recording apparatus comprises a G code input unit 710, a decoder 720, first to third memories 730, 740 and 780, a controller 750, a tuner 760, a recording section 770 and an OSD unit 790. In accordance with the fourth embodiment of the present invention, the reservation-recording apparatus is adapted to perform the reservation-recording of the VCR according to channel positions previously stored by regional groups.

The functions of the G code input unit 710, the decoder 720, the first memory 730, the tuner 760, the recording section 770 and the OSD unit 790 in FIG. 11 are the same as those of the G code input unit 10, the decoder 20, the first memory 30, the tuner 50, the recording section 70 and the OSD unit 110 in FIG. 4, respectively, and a detailed description thereof will thus be omitted.

In accordance with the fourth embodiment of the present invention, the second memory 740 is adapted to store broadcasting station names, guide channel numbers and channel positions by region codes. To this end, the second memory 740 may include a plurality of memory elements grouped by region codes.

The third memory 780 is adapted to store the recording start time, the date, the recording length of the reservation-recording data from the decoder 720 and a desired one of the channel positions from the second memory 740 under the control of the controller 750. The desired channel position stored in the third memory 780 corresponds to the guide channel number of the reservation-recording data from the decoder 720.

The controller 750 is adapted to control the tuner 760, the recording section 770, the third memory 780 and the OSD unit 790 in response to the outputs from the first and second memories 730 and 740 and the decoder 720.

The operation of the reservation-recording apparatus for the VCR with the above-mentioned construction in accordance with the fourth embodiment of the present invention will hereinafter be described in detail with reference to FIG. 11.

First, the broadcasting station names, the guide channel numbers and the channel positions are stored by the region codes in the second memory 740. Then, the user selects a desired one of the region codes to use a desired guide channel number. The controller 750 enables only one of the grouped memory elements in the second memory 740 corresponding to the selected region code. As a result, the channel position mapping operation is completed.

Then, upon receiving the G code through the G code input unit 710, the decoder 720 decodes the received G code into the reservation-recording data. The recording start time, the date and the recording length of the reservation-recording data from the decoder 720 are stored into the third memory 780 and the guide channel number thereof is applied to the controller 750.

The controller 750 finds the same one of the guide channel numbers stored in the enabled memory element of the second memory 740 as the guide channel number from the decoder 720 and substitutes the found guide channel number with the corresponding channel position stored in the enabled memory element. Then, the controller 750 stores the substituted channel position into the third memory 780.

The subsequent recording procedure is the same as that in FIG. 4 and a description thereof will thus be omitted.

Figure 12B:
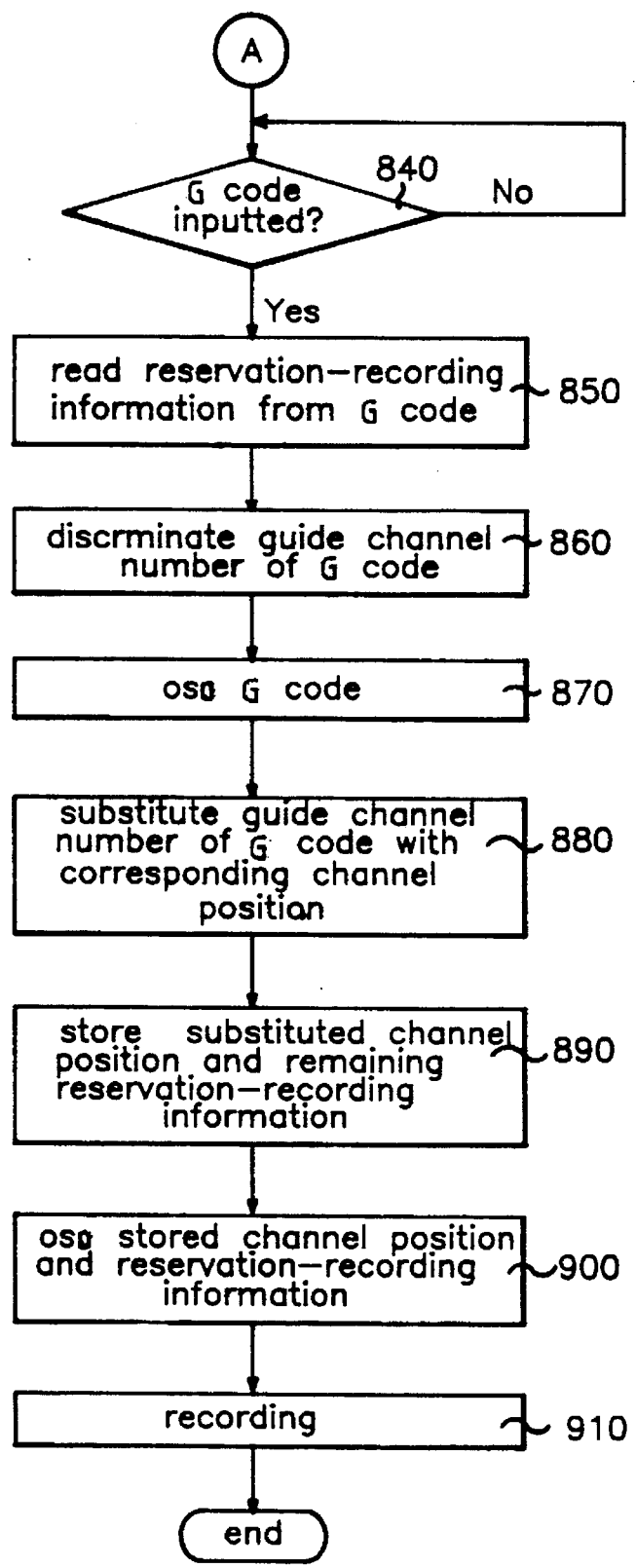
Figure 12B:
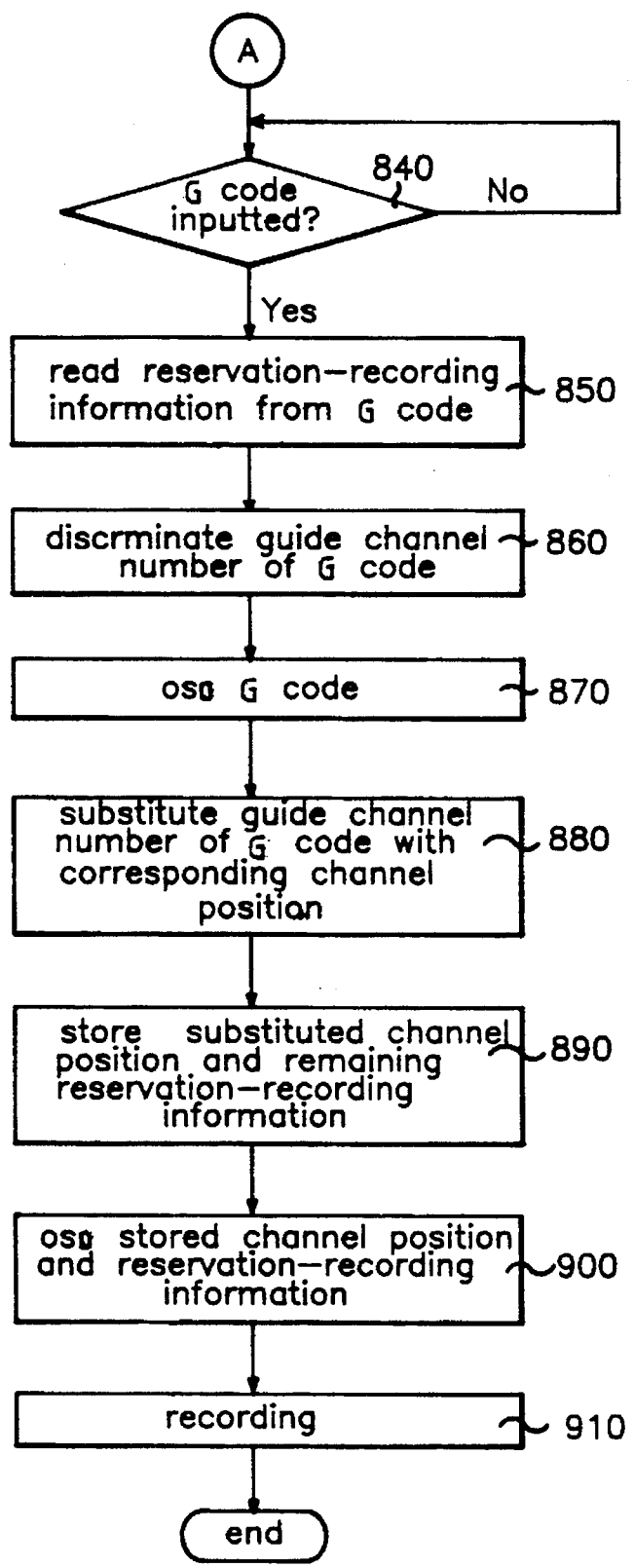

Referring to FIGS. 12A and 12B, there are shown flowcharts illustrating a method of performing the reservation-recording of the VCR in accordance with the fourth embodiment of the present invention. In accordance with the fourth embodiment of the present invention, the reservation-recording method is to perform the reservation-recording of the VCR utilizing the channel position mapping function by the regions.

First, the broadcasting station names, the guide channel numbers and the channel positions are stored by the region codes at the step 800 and displayed on the screen at the step 810, so that they can be recognized by the user.

Then, the selection of the broadcasting station names, the guide channel numbers and the channel positions of the desired region is performed by selecting the corresponding region code at the step 820. Only the memory element corresponding to the selected region code is enabled at the step 830. Namely, enabled at the step 830 is only the memory element in which the broadcasting station names, the guide channel numbers and the channel positions of the desired region are stored. As a result, only the guide channel numbers and the channel positions stored in the enabled memory element are available.

If the G code is inputted for the reservation-recording after the selection of the desired region code, discrimination is performed with respect to the guide channel number of the inputted G code. Namely, it is checked at the step 840 whether the G code is inputted. If it is checked at the step 840 that the G code is inputted, the reservation-recording information is read from the inputted G code at the step 850 and the guide channel number of the read reservation-recording information is discriminated at the step 860. The inputted G code and the discriminated guide channel number are displayed on the screen at the step 870, so that the user can check whether the inputted G code is correct.

The discriminated guide channel number of the inputted G code is substituted with the channel position of the same one of the stored guide channel numbers at the step 880. Stored at the step 890 are the substituted channel position and the read remaining reservation-recording information of the G code. The stored channel position and reservation-recording information are displayed on the screen at the step 900.

The recording operation is performed on the basis of the stored channel position and reservation-recording information at the step 910. Namely, when the present time reaches the recording start time of the stored reservation-recording information, the tuning data corresponding to the stored channel position is outputted, the broadcasting signal is tuned according to the outputted tuning data and the tuned broadcasting signal is recorded.

As apparent from the above description, according to the present invention, the channel positions (the actual channel numbers) corresponding to the guide channel numbers are automatically mapped. Therefore, the user has no trouble of mapping the guide channel numbers one by one according to the desired country or region. Also, the mapping of the channel positions may automatically be performed on the basis of the AGC levels. This results in a reduction in a picture noise. Further, the guide channel numbers and the channel positions may previously be mapped by regions. This has the effect of performing the G code reservation-recording readily only with the selection of the desired region by the user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A channel mapping device in a VCR reservation-recording device comprising:

tuning means for synchronizing to a broadcasting signal out of broadcasting signals;

pilot signal detection means for detecting a pilot signal from the broadcasting signal synchronized in the tuning means;

memory means for storing the name of broadcasting station, central channel number, and local channel numbers of each of the broadcasting signals as well as tuning data for synchronizing the tuning means; and, control means for applying the tuning data in the memory means to the tuning means, comparing the pilot signal received from the pilot signal detection means with the names of broadcasting stations in the memory means, and for storing local channel numbers in the memory means together with a central channel number in the memory means in one category as a result of the comparison.

2. The device as claimed in claim 1, wherein, in case a name of broadcasting station which is the pilot signal received from the pilot signal detection means, upon applying the tuning data in the memory means to the tuning means, is in agreement to a name of broadcasting station in the memory means as a result of the comparison, the control means stores the local channel number in the memory means as a channel number corresponding to the tuning data synchronized presently or a position address of the tuning data, together with the central channel number into the same category.

3. A channel mapping device in a VCR reservation-recording device comprising:

tuning means for synchronizing to a broadcasting signal out of broadcasting signals;

gain controlling means for controlling a level of the broadcasting signal synchronized in the tuning means;

pilot signal detection means for detecting a pilot signal from the broadcasting signal received from the gain controlling means;

memory means for storing the name of broadcasting station, central channel number, and local channel numbers of each of the broadcasting signals as well as tuning data for synchronizing the tuning means and a gain controlled value from the gain controlling means; and, control means for applying the tuning data in the memory means to the tuning means, and storing local channel numbers in the memory means together with a central channel number in the memory means in one category depending on the magnitude of the gain controlled value.

4. The device as claimed in claim 3, wherein in case a name of broadcasting station which is the pilot signal receivable from the pilot signal detection means on applying the tuning data in the memory means to the tuning means, is in agreement to more than one name of the broadcasting stations in the memory means as the result of the comparison, the control means stores a channel number corresponding to the tuning data having the least gain controlled value of the gain controlling means or a positional address of the tuning data having the least gain controlled value as a local channel number, together with the central channel number into the same category.

5. A channel mapping device in a VCR reservation-recording device comprising:

tuning means for synchronizing to a broadcasting signal out of broadcasting signals;

pilot signal detection means for detecting a pilot signal from the broadcasting signal synchronized in the tuning means;

memory means for storing the name of broadcasting station, central channel number, local channel numbers, and nation number of each of the broadcasting signals as well as tuning data for synchronizing the tuning means; and control means for applying the tuning data in the memory means to the tuning means, and comparing the pilot signal received from the pilot signal detection means to the names of broadcasting stations and nation number in the memory means for storing local channel numbers in the memory means together with a central channel number in the memory-means in one category as a result of the comparison.

6. The device as claimed in claim 5, wherein, in case a name of broadcasting station and a nation number which are the pilot signal receivable from the pilot signal detection means on applying the tuning data in the memory means to the tuning means, are in agreement to a name of broadcasting station and a nation number in the memory means respectively as the result of the comparison, the control means stores the local channel number in the memory means as a channel number corresponding to the tuning data synchronized presently or a position address of the tuning data, together with the central channel number into the same category.

7. A channel mapping method in a VCR reservation-recording method comprising:

a first step for reading in tuning data from a memory means which stores names of broadcasting stations, central channel numbers, and local channel number as well as tuning data, for synchronizing to a broadcasting signal, a second step for detecting a pilot signal from the broadcasting signal synchronized in the first step for comparing the detected pilot signal to the names of broadcasting stations stored in the memory means; and, a third step for storing the local channel numbers in the memory means, together with the central channel number in the memory means into one category according to a result of the comparison in the second step.

8. The channel mapping method as claimed in claim 7, wherein, in the third step, a channel number or a position address corresponding to the tuning data synchronized presently is stored as the local channel number having found to have the same name of broadcasting station as a result of the comparison in the second step, together with the central channel number into one category.

9. A channel mapping method in a VCR reservation-recording method comprising:

a first step for reading in tuning data from a memory means which stores names of broadcasting stations, central channel numbers, and local channel number as well as tuning data and a gain controlled value for synchronizing to a broadcasting signal, and controlling the gain controlled value of gain controlling means for controlling a level of a broadcasting signal which is an output signal of tuning means;

a second step for detecting a pilot signal from the broadcasting signal which is an output signal of the gain controlling means in the first step for comparing the detected pilot signal to the names of broadcasting stations stored in the memory means; and, a third step for storing the local channel numbers in the memory means, together with the central channel number in the memory means into the same category according to a result of the comparison in the second step and the gain controlled value of the gain controlling means.

10. The channel mapping method as claimed in claim 9, wherein, in case it is found that two or more than two broadcasting stations have the same name in the second step, a channel number or a position address corresponding to the tuning data having the least gain controlled value is stored as the local channel number in the memory means, together with the central channel number in the memory means into one category in the third step.

11. A channel mapping method in a VCR reservation-recording method comprising:

a first step for reading in tuning data from a memory means which stores names of broadcasting stations, central channel numbers, local channel number, and nation numbers as well as tuning data, for synchronizing to a broadcasting signal;

a second step for detecting a pilot signal from the broadcasting signal synchronized in the first step for comparing the detected pilot signal to the names of broadcasting stations stored in the memory means; and, a third step for storing the local channel numbers in the memory means, together with the central channel number in the memory means into one category according to a result of the comparison in the second step.

12. The channel mapping method as claimed in claim 11, wherein, in the third step, a channel number or a position address corresponding to the tuning data synchronized presently is stored as the local channel number having found to have the same name of broadcasting station and nation number as a result of the comparison in the second step, together with the central channel number into one category.

13. The channel mapping method as claimed in any one of the claims of 7, 9, and 11, further comprising the steps of:

applying a G-code; and decoding the G-code, and applying a decoded guide channel and a read-in tuning data corresponding to the local channel stored in one category to the tuning means, for carrying out a reservation-recording.

* * * * *